July 2, 1963
F. L. BAYBARZ
3,096,108
ADJUSTABLE RACK CONNECTION
Filed March 16, 1961
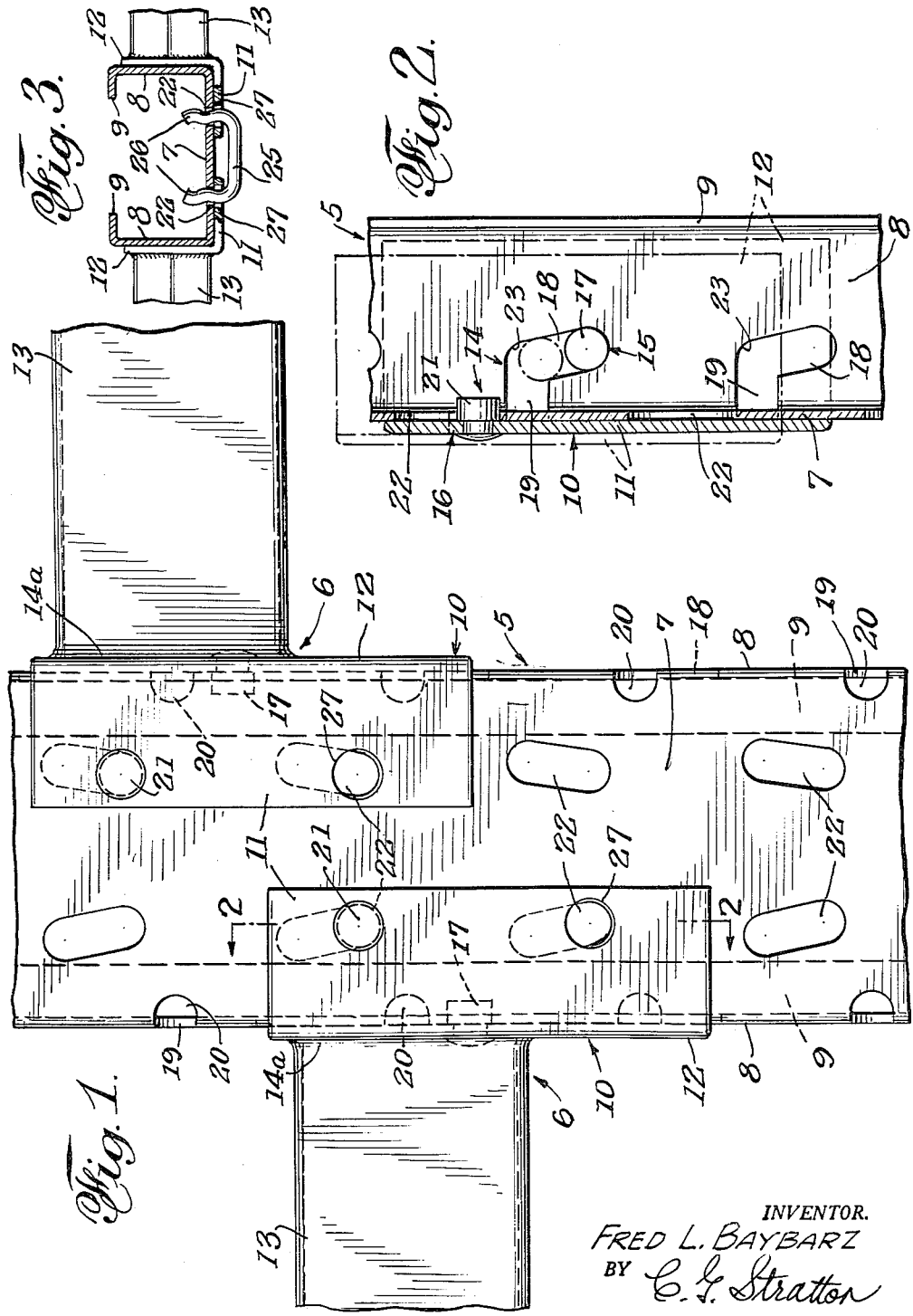
INVENTOR.
FRED L. BAYBARZ
BY C. J. Stratton
ATTORNEY

United States Patent Office 3,096,108
Patented July 2, 1963

3,096,108
ADJUSTABLE RACK CONNECTION
Fred L. Baybarz, Lodi, Calif., assignor of one-half to Green-Penny Co., Los Angeles, Calif., a corporation of California
Filed Mar. 16, 1961, Ser. No. 96,261
6 Claims. (Cl. 287—54)

This invention relates to adjustable racks and deals more particularly with means for effecting separable connection of article-supporting members and risers or uprights in rack construction.

An object of the present invention is to provide means of the character referred to that is especially efficient for connecting a cantilever support member to a riser or upright by means of bayonet slot-and-pin connections that bias the support to connected position in a direction tarnsverse to the longitudinal extent of the support.

Another object of the invention is to provide means, as above mentioned, that is combined with portions that connect or hold a cantilever support against end-wise separation from a riser or upright, thereby insuring firm connection of support and upright only by gravitational force on the cantilever support.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a broken side elevational view of adjustable rack connection means according to the present invention.

FIG. 2 is a vertical sectional view thereof as taken on the line 2—2 of FIG. 1.

FIG. 3 is a cross-sectional view showing a lock means for the present invention.

The drawing shows a portion of an upright 5 that, in the usual way, may extend fixedly and vertically between lower and upper horizontal members or be held in vertical position in any suitable way. One or more supports 6 may be connected to said upright, the means of the present invention effecting separable, yet firm, adjusted connection between the upright 5 and said support or supports 6.

In the present case, the upright 5 comprises a metal channel formed to have a web 7, flanges 8, and inturned return flanges 9 on the flanges 8. For lightness with strength, said upright is advantageously made of sheet metal stock rather than as a rolled section. Before forming to the channel shape thereof, the connection means of this invention, as will later be described, is formed as the edges of openings produced by shearing or stamping out portions of the sheet metal.

The supports 6 are each advantageously made of an anchor angle member 10 having a front leg 11 and a side leg 12, and a support arm 13 of any desired cross-sectional form and extending from the angle leg 12 to whatever length desired. Both the angle member 10 and the arm 13 are advantageously made of sheet metal and may be welded together, as at 14a.

The present connecting means 14 comprises a pin and bayonet slot connection 15 between the flanges 8 of the upright 5 and the angle legs 12 of the support 6, and a pin and slot connection 16 between the web 7 of the upright and the angle legs 11 of the support. Thus, the connection means 15 and 16 are disposed at right angles to each other whereby the angle member 10 may be applied in a direction toward the outer face of the web 7 of the upright with the connection means 16 achieving initial non-locking engagement, and the latter connection means, by a downward movement of the angle member relative to the upright, effects support of the latter member by the upright while the connection means 15 so connects the member 10 and upright 5 as to obviate longitudinal separation of the support 6 in a direction away from the flange 8 of the upright.

The connecting means 15 comprises a pin 17 extending from the inner face of the leg 12 of anchor member 10, and a bayonet slot 18 formed in each of the flanges 8 of the upright. As best seen in FIG. 2, said slots 18 are arranged in vertical spacing adjacent to and having entry portions 19 that extend in part into the web 7 to form pin-passing openings 20. It will be noted that the slots 18 slope rearwardly from the web.

The connecting means 16 comprises a pin 21 extending from the inner face of the leg 11 of the anchor member 10, and a straight slot 22 formed in web 7 of the upright. As shown in FIG. 1, a slot 22 is provided for each slot 18 and said slots 22 are disposed at an angle so as to have their upper ends nearer to the flange 8 than are the lower ends thereof.

In practice, one or both flanges 8 of the upright may be provided with a vertical series of slots 18 and with operatively associated slots 22 with the slots 18 and 22 arranged in alternate spacing so to retain the strength of the upright web and flanges. The pins 17 and 21 are, therefore, spaced accordingly for respective operative association with the slots 18 and 22.

To apply the anchor member 10 to the upright 5 so as to lock the same to said upright and, therefore, hold the support arm in cantilever extension from one of the upright flanges 8, the inner face of leg 12 of member 10 is placed against the outer face of said flange 8 with the pin 17 approximately aligned with the pin-passing opening 20 of one of the bayonet slots 18. In this position, the pin 21 on the leg 11 of said member 10 will be in substantial alignment or register with the upper end of the related slot 22 in the web 7. Now the anchor member 10 is moved toward the upright, causing the pin 17 to enter the entry or lead-in portion 19 of the bayonet slot and the pin 21 to enter said upper end of the slot 22. When the pin 17 encounters the back edge 23 of the slot 18, the leg 11 of member 10 will be forwardly spaced from the upright web 7, as indicated by the dot-dash line position of member 10 in FIG. 2.

Now, all that is necessary to effect a firm yet separable connection between member 10 and the upright is to allow the member 10 to drop so that the pin 17 is drawn rearwardly by the slope of slot 18, thereby drawing the leg 11 of member 10 tightly against the web 7 of the upright, and so that the pin 21 is drawn laterally by the slope of slot 22, thereby drawing the leg 12 of member 10 tightly against the flange 8 of the upright.

Thus connected, the anchor member achieves a two-sided engagement with the upright that obviates movement of the same and the support arm 13 thereof up or down or laterally in any direction. Only a sharp upward push on arm 13 is necessary to effect removal thereof. The flexibility of vertical adjustment is clear and is dependent on the vertical spacing of the slots 18 and 22 along the upright.

Without change in inventive concept the member 10 may be formed as a channel member with flanges that are associated with both flanges of the upright, and with two pins 17 to engage the slots 18 in both said flanges, and two pins 21 to engage the associated slots 22. In this case, the slots 22 are vertical rather than sloping so the pins 21 slide straight down when the supports 6 are being applied.

While the above-described connections will ordinarily retain the position of the supports 6, a lock may be provided to so lock the supports to the upright 5 as to prevent separation or removal of said supports when the lock is in place.

As seen in FIG. 3, a U-piece 25 has spring legs 26 that enter holes 27 in the legs 11 of the angle members 10 and extend into and through the slots 22 in register with said holes 27. Said legs are kinked, substantially as shown, so the same have snap retention with the upright web 7. The holes 27 are preferably larger, diametrally, than the width of slots 22 so the legs 26 of the U-piece will clear said holes when being entered into the slots whether or not the pins 21 are fully seated on the bottoms of said slots.

Either one or two oppositely aligned load supports 6 may be locked to the upright 5 in the above manner.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A rack connection comprising an upright having at least two vertical sides at right angles to each other, one of said sides having a downwardly extending bayonet slot formed therein and having a pin-passing opening that is open on the other of said sides, said other side having a generally longitudinal end-closed slot formed therein, an anchor member having two legs at right angles to each other and provided with a support extension affixed to one of said legs, a fixed pin extending from one leg of the anchor member to enter and pass through the pin-passing opening in the bayonet slot into engagement with said slot when the other leg of said anchor member is being moved in a direction toward and in flatwise engagement with the side of the upright that has the end-closed slot, and a fixed pin on said other leg and extending into said end-closed slot, the bayonet slot being disposed at an angle to draw the pin therein in a direction to move the anchor leg that has the other pin toward and in flatwise engagement with the support.

2. A rack connection comprising an upright having at least two vertical sides at right angles to each other, one of said sides having a downwardly extending bayonet slot formed therein and having a pin-passing opening that is open on the other of said sides, said other side having a generally longitudinal end-closed slot formed therein, an anchor member having two legs at right angles to each other and provided with a support extension affixed to one of said legs, a fixed pin extending from one leg of the anchor member to enter and pass through the pin-passing opening in the bayonet slot into engagement with said slot when the other leg of said anchor member is being moved in a direction toward and in flatwise engagement with the side of the upright that has the end-closed slot, and a fixed pin on said other leg and extending into said end-closed slot, the end-closed slot being disposed at an angle to draw the pin therein in a direction to move the anchor leg that has the other pin toward and in flatwise engagement with the support.

3. A rack connection comprising an upright having at least two vertical sides at right angles to each other, one of said sides having a downwardly extending bayonet slot formed therein and having a pin-passing opening that is open on the other of said sides, said other side having a generally longitudinal end-closed slot formed therein, an anchor member having two legs at right angles to each other and provided with a support extension affixed to one of said legs, a fixed pin extending from one leg of the anchor member to enter and pass through the pin-passing opening in the bayonet slot into engagement with said slot when the other leg of said anchor member is being moved in a direction toward and in flatwise engagement with the side of the upright that has the end-closed slot, and a fixed pin on said other leg and extending into said end-closed slot, each of said slots being disposed at an angle to draw the pin therein in a direction to move the legs of the anchor member toward and in flatwise engagement with the support.

4. A rack connection according to claim 3, the two sides of the upright defining an outer corner therebetween, and the two legs of the anchor member defining an inner corner therebetween, said two corners being drawn into engagement by the mentioned pins as the same are drawn in a direction away from said engaged corners by the angles of the respective slots.

5. A rack connection according to claim 3 in which the bayonet and end-closed slots are vertically offset with the latter above the former, and in which the respective pins are similarly vertically offset.

6. A rack connection according to claim 3 including a U-piece lock member having a spring leg extending into the end-closed slot and through the anchor member.

References Cited in the file of this patent
UNITED STATES PATENTS

| | | |
|---|---|---|
| 2,733,786 | Drake | Feb. 7, 1956 |
| 2,932,368 | Schell | Apr. 12, 1960 |